United States Patent
Reichert et al.

(10) Patent No.: US 9,796,030 B2
(45) Date of Patent: Oct. 24, 2017

(54) METHOD AND DEVICE FOR FINE MACHINING A TOOTHED WORKPIECE, AND PROGRAM FOR CONTROLLING SAID DEVICE

(71) Applicant: THE GLEASON WORKS, Rochester, NY (US)

(72) Inventors: Gerhard Reichert, Maisach-Gernlinden (DE); Walter Funke, München (DE); Engelbert Schauer, Unterschleissheim (DE)

(73) Assignee: THE GLEASON WORKS, Rochester, NY (US)

( * ) Notice: Subject to any disclaimer, the term of this patent is extended or adjusted under 35 U.S.C. 154(b) by 38 days.

(21) Appl. No.: 14/904,785

(22) PCT Filed: Jul. 11, 2014

(86) PCT No.: PCT/IB2014/001313
§ 371 (c)(1),
(2) Date: Jan. 13, 2016

(87) PCT Pub. No.: WO2015/008128
PCT Pub. Date: Jan. 22, 2015

(65) Prior Publication Data
US 2016/0151847 A1  Jun. 2, 2016

(30) Foreign Application Priority Data
Jul. 17, 2013 (DE) .......................... 10 2013 011 941

(51) Int. Cl.
B24B 53/06 (2006.01)
B23F 19/05 (2006.01)
(Continued)

(52) U.S. Cl.
CPC ........ B23F 19/057 (2013.01); B23F 23/1231 (2013.01); B24B 53/075 (2013.01)

(58) Field of Classification Search
CPC ... B23F 19/057; B23F 23/1231; B24B 53/075
(Continued)

(56) References Cited

U.S. PATENT DOCUMENTS 2,105,896 A * 1/1938 Stubbs .................... B23F 19/05
451/114
5,395,189 A 3/1995 Schriefer
(Continued)

FOREIGN PATENT DOCUMENTS

DE 4214851 A1 11/1993
DE 4323935 C1 10/1994
(Continued)

OTHER PUBLICATIONS

International Search Report and Written Opinion for PCT/IB2014/001313, ISA/EPO, dated Mar. 24, 2015, 10 pgs., with English translation (9 pgs.).

*Primary Examiner* — George Nguyen
(74) *Attorney, Agent, or Firm* — Robert L. McDowell

(57) ABSTRACT

A method and a device for the fine-machining of a toothed workpiece with a toothed finishing tool (10) which meshes with the workpiece in mutual tooth engagement are, for the purpose of producing conically modified tooth flanks, designed according to the invention in such a way that in the dressing process the finishing tool (10) and the dressing tool (11) are set at a position of reduced center distance (a) that is offset from a position of maximum center distance.

15 Claims, 4 Drawing Sheets

Figure 1:
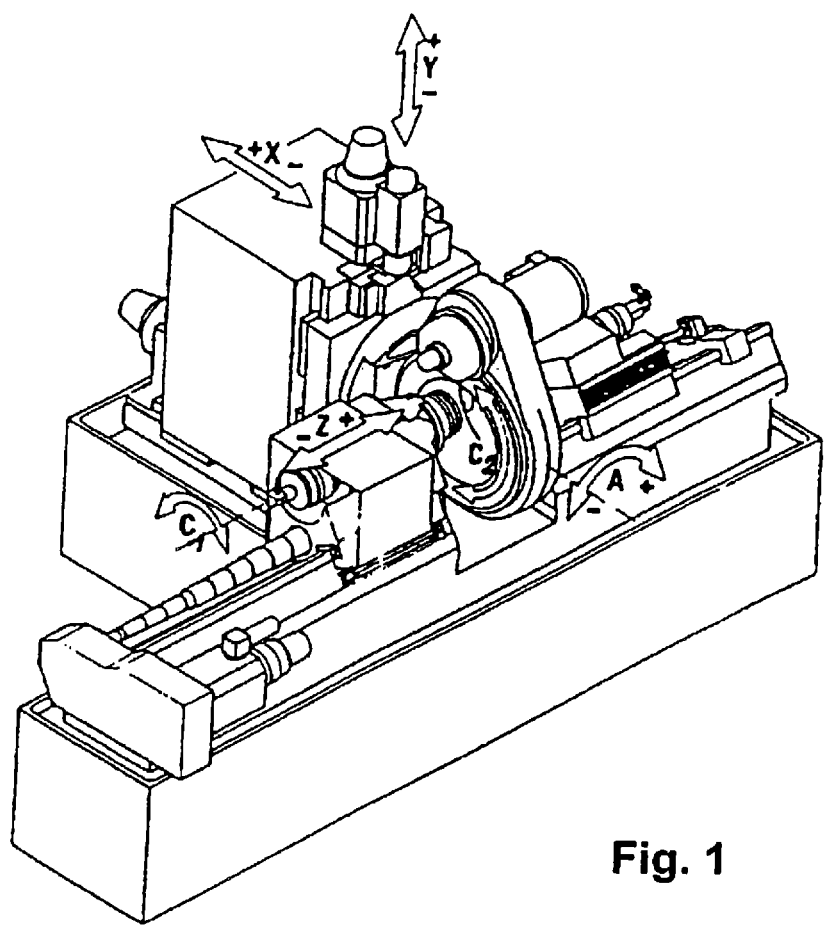

(51) Int. Cl.
*B24B 53/075* (2006.01)
*B23F 23/12* (2006.01)

(58) Field of Classification Search
USPC .......................................................... 451/47
See application file for complete search history.

(56) References Cited

U.S. PATENT DOCUMENTS

| | | | |
|---|---|---|---|
| 5,443,338 A | 8/1995 | Huber et al. | |
| 5,591,065 A * | 1/1997 | Mizuno | B24B 53/075 451/180 |
| 6,190,241 B1 * | 2/2001 | Schriefer | B23F 21/03 451/10 |
| 6,273,801 B1 * | 8/2001 | Rappold | B23F 21/03 451/253 |
| 6,497,610 B1 * | 12/2002 | Reichert | B23F 23/1231 451/21 |
| 6,958,000 B2 * | 10/2005 | Yoshioka | B23F 23/1281 409/55 |
| 8,182,313 B2 * | 5/2012 | Schaeferling | B23F 19/057 451/11 |

FOREIGN PATENT DOCUMENTS

| | | |
|---|---|---|
| DE | 19500801 A1 | 9/1996 |
| DE | 102010024366 A1 | 12/2011 |
| JP | 07060542 A * | 3/1995 ............ B23F 19/007 |

* cited by examiner

METHOD AND DEVICE FOR FINE MACHINING A TOOTHED WORKPIECE, AND PROGRAM FOR CONTROLLING SAID DEVICE

The invention concerns a method for the fine-machining of a toothed workpiece, using a toothed finishing tool which meshes with the workpiece in mutual tooth engagement, wherein the finishing tool is subjected to a dressing process in which the finishing tool and a toothed dressing tool, in tooth engagement with each other, rotate about their respective gear axes which are arranged relative to each other at a center distance different from zero and at an axis-crossing angle different from zero. In addition, the invention also concerns a device with the capability to perform the method, as well as a controller program to control the device accordingly.

To give an example for such a method, the process of gear honing with a dressable honing ring is a known practice. The honing ring represents the finishing tool for the toothed workpiece in process. The dressing tool for the honing ring has the form of an externally toothed diamond dressing gear which in the dressing process meshes with the internal toothed profile of the honing ring. In this pairing of gears, the respective gear axes of the finishing tool and the dressing tool, which cross each other at a non-zero angle, are arranged at maximum center distance relative to each other and in such a way that the relative infeed movement for the dressing process takes place in the direction of the center distance.

With this arrangement of the gear axes relative to each other, the geometry of the dressing tool is transferred to the finishing tool in the dressing process. If a workpiece is subsequently brought into meshing engagement with the finishing tool in the same relative position, the same flank geometry is transferred to the workpiece. However, the use of the workpieces in gear transmissions often necessitates flank modifications to be made on the gear teeth. Specifically, conical flank modifications are needed in order to deal with the bending of axle shafts under load. However, this makes the dressing tools expensive and complicated to produce. Furthermore, a separate dressing tool has to be available for each flank modification. Alternatively, the flank modifications can be achieved through appropriate adjustments to the relative positions and through additional movements of the gear axes in the processing of the workpiece. This involves a correspondingly high level of complexity in the control of the gear axes. Furthermore, in the machining of workpieces whose gear profiles are adjoined by shoulders in the sense of an interfering contour, the range of the linear movement required for the longitudinal honing in the direction of the workpiece gear axis is limited. Pure infeed honing alone, on the other hand, where no such linear movement but only axial infeed is taking place, results in a higher surface roughness.

This invention has the objective to propose a method of the same generic kind as described above, which reduces the complexity and cost of producing workpieces with conically modified tooth flanks of good surface quality, further to provide a device that is controlled according to the method, as well as a controller program with the requisite capability.

From a method-oriented point of view, the invention solves this task through the concept that the gear axes of the finishing tool and of the dressing tool are arranged relative to each other in a position that is offset from the position of maximum center distance to a position of reduced center distance.

As a result of performing the dressing process with the dressing tool offset in accordance with the invention one obtains a corresponding modification of the teeth of the finishing tool. In the preferred case where the toothed circumferences of the dressing tool and the not yet dressed finishing tool are cylindrical without deviation, the dressing position according to the invention produces a conical flank modification of the finishing tool. Thus, while the tooth thickness of the dressing tool is constant over the width of the teeth (disregarding tooth trace convexities), the addendum modification of the teeth of the dressed finishing tool changes over the tooth width. It is best to perform the infeed of the dressing tool in the radial direction of the finishing tool, but it is also possible to work with an infeed for example only in a direction orthogonal to the center distance.

When using a dressing tool with a gear tooth profile that is cylindrical without deviation, it is particularly advantageous to add a superimposed component parallel to the gear axis of the dressing tool to the movement of the latter in the dressing process. Such a superposition, which is known in particular as longitudinal feed of the workpiece in longitudinal stroke honing, improves the surface quality of the finishing tool in the dressing process in such a way that even if the subsequent finishing operation of workpieces is performed without longitudinal feed or extremely reduced longitudinal feed, the finished workpiece surfaces will have a noticeably better surface roughness.

In an advantageous embodiment, a movement component orthogonal to the gear axis of the dressing tool is superimposed on the relative movement between the finishing tool and the dressing tool which are in meshing engagement with each other. This can be realized in particular if the dressing tool, in spite of being offset from the position of maximum center distance, is kept in line contact with the finishing tool in the dressing process.

In embodiments of particular practical importance, the finishing of the workpiece with the dressed finishing tool is performed in such a way that the workpiece is machined with the dressed finishing tool essentially in a position of maximum center distance between the gear axis of the finishing tool and the gear axis of the workpiece, meaning that the center distance in this position is at its exact maximum or deviates from the latter only to the extent necessary for the generation of ordinary flank modifications of the teeth of the workpiece. As a result, the conically modified gear geometry of the finishing tool, which was obtained in the dressing process as a consequence of the offset position of the dressing tool, is transferred to the workpiece.

This transfer process can be performed in such a way that in the machining of the workpiece, the axis-crossing angle between the respective gear axes of the workpiece and of the finishing tool is set to a value corresponding to the axis-crossing angle that was used in the dressing process between the gear axes of the dressing tool and of the finishing tool. The conicity of the right and left flanks of the workpiece teeth has in this case the same symmetry as the conicity of the teeth of the dressing wheel. On the other hand, one could also follow a procedure where in the machining of the workpiece, the axis-crossing angle between the gear axes of the workpiece and of the finishing tool is set to a value that is offset from the axis-crossing angle that was used in the dressing process between the gear axes of the dressing tool and of the finishing tool. This has the result that the respective conicities of the right flanks and the left flanks of the teeth of the workpiece are not symmetric to each other.

From a device-oriented point of view, the task of the invention is solved by a device to perform the finishing operation on a toothed workpiece, with a toothed finishing tool that is rotatable about its gear axis, a toothed dressing tool that is rotatable about its gear axis, a device to set the relative position of the two gear axes, and a controller device serving to control the position-setting device with the distinguishing feature that the controller device is designed with the capability to perform a setting that enables the method according to one of the claims 1 to 10 to be performed.

The arrangement of the axes in this device can follow the standard geometry of conventional honing machines, wherein the dressing tool and the workpiece to be machined are alternatingly supported by a workpiece spindle in the rotation about their respective gear axes, and wherein the honing ring which forms the fine-machining tool is supported by a pivot bearing device in the rotation about its gear axis. For the rotation about the gear axes, there can be a separate drive source provided for each axis. Alternatively, only one of the axes has its own drive source while the rotation about the other axis occurs as a result of being taken along by the meshing engagement between the fine-machining tool and the dressing tool or between the fine-machining tool and the workpiece. The inventive concept further includes a swiveling device, by means of which the axis-crossing angle between the rotary axes of the workpiece spindle and the fine-machining tool can be set to a desired magnitude. In addition, the arrangement includes a linear displacement axis which allows the setting of the center distance between the two rotary axes. Finally, the relative position of the two axes is adjustable in a plane that runs transverse to the center distance. A system with these capabilities allows the relative positions required in performing the method according to one of the claims 1 to 10 to be set between the fine-machining tool and the dressing tool as well as between the fine-machining tool and the workpiece to be machined.

Preferably, the controller device through which these settings can be made runs under the command of a program. Thus, the controller device can be programmed to perform desired variants of the method by loading a corresponding control program.

Figure 2A:
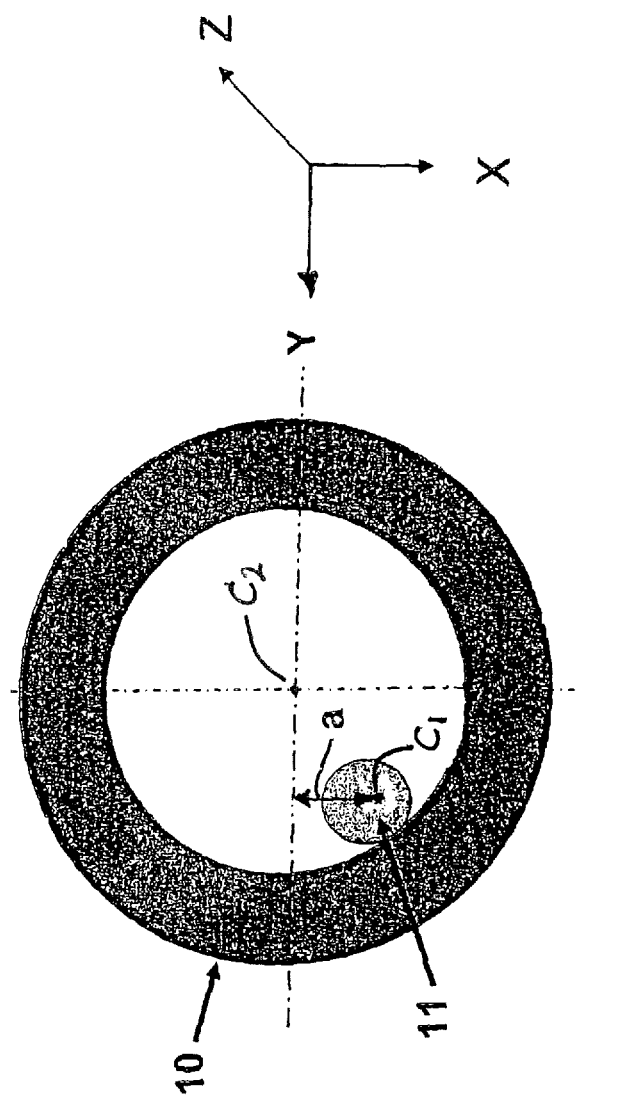
Figure 2B:
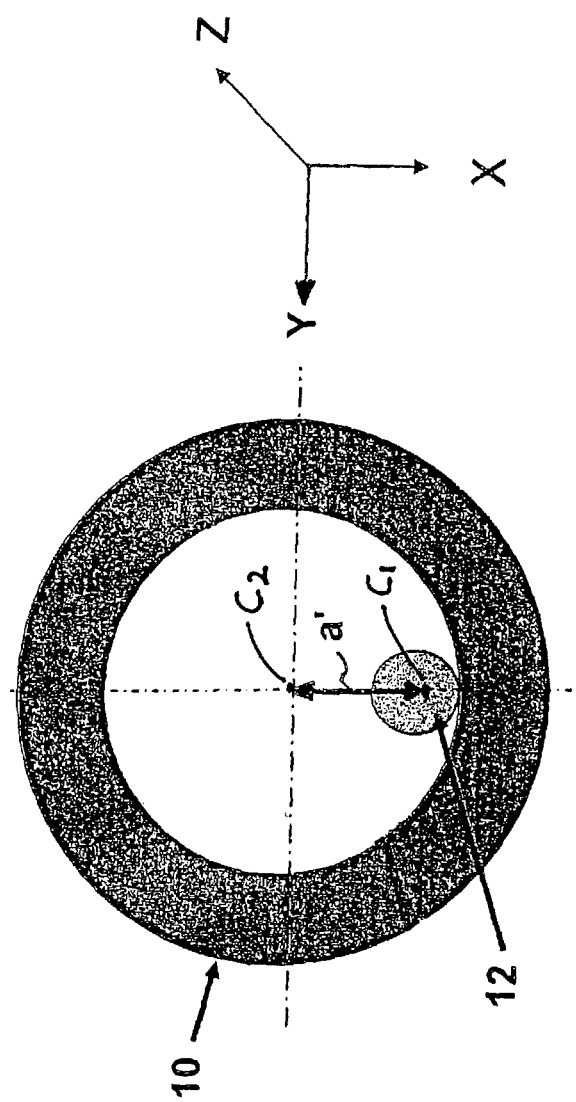
Figure 3:
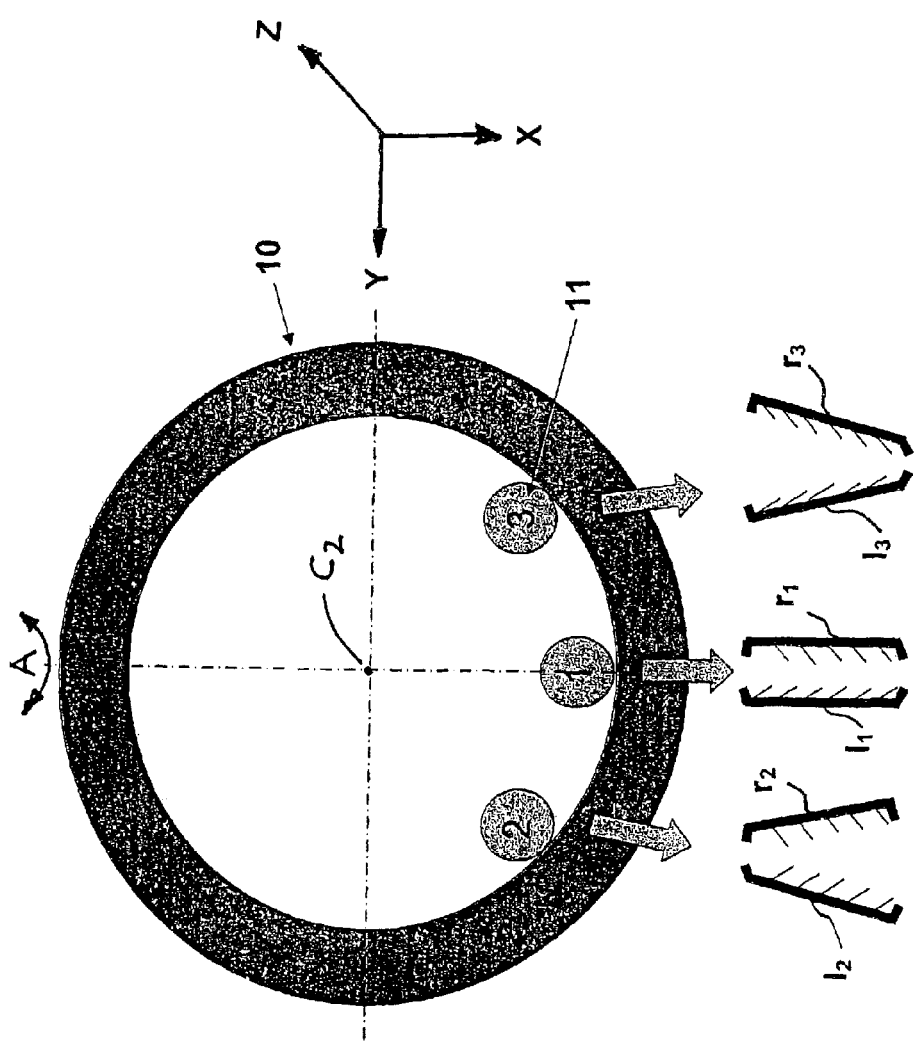

Further distinguishing features, details and advantages of the invention will become evident from the following description wherein the invention is presented through exemplary details that are illustrated in the attached drawings, wherein FIG. 1 illustrates the geometrical arrangement of the axes of a conventional gear-honing machine;

FIGS. 2*a* and 2*b* schematically represent a relative position between a honing ring and a dressing tool in the dressing process, or between a honing ring and a workpiece in the machining process; and FIG. 3 schematically represents different relative positions of a honing ring and a dressing tool.

In FIG. 1, the reference symbol $C_1$ identifies the rotary axis of a workpiece spindle onto which an externally toothed workpiece or an externally toothed dressing tool can be clamped in such a way that the axis of the toothed circumference (also referred to herein as the gear axis) of the workpiece or the dressing tool coincides with the rotary axis $C_1$. Further, the reference symbol $C_2$ identifies the rotary axis of a toothed honing tool which serves as finishing tool and is rotatably supported in such a way that its gear axis coincides with the rotary axis $C_2$. In the following, the two gear axes will therefore be identified likewise as $C_1$ and $C_2$.

The crossing angle between the rotary axes or gear axes $C_1$ and $C_2$ is adjustable by way of a swivel movement about the swivel axis A. Furthermore, the center distance between the two axes is adjustable along a linear displacement axis X running in the direction of the center distance. In a plane extending transverse to the X-axis, the relative position of the two rotary axes or gear axes $C_1$ and $C_2$ is adjustable along a linear displacement axis Y running transverse to the linear displacement axis X and to the rotary axis $C_1$ and along a linear displacement axis Z running parallel to the rotary axis $C_1$.

In this system of axes, the drawing plane of FIGS. 2*a* and 2*b* extends parallel to the X/Y-plane, and the view is directed parallel to the Z-axis. As the radial plane of the honing ring which forms the circular-shaped fine-machining tool 10 is inclined by the axis-crossing angle against the X/Y-plane that runs parallel to the radial plane of the rotary axis $C_1$, the fine-machining tool 10 should actually not appear circular in FIGS. 2*a* and 2*b*, but rather as an elliptical projection of its circular shape. However, as the drawings are of a purely schematic nature and the axis-crossing angle is normally small, this fine point has been disregarded for the sake of simplicity.

In the representation of FIGS. 2*a* and 2*b*, the rotary axes $C_1$ and $C_2$ run parallel to the X/Y-plane. Accordingly, the center distance a between the gear axis $C_1$ of a toothed dressing tool clamped to the workpiece spindle and the gear axis $C_2$ of the fine-machining tool 10 extends parallel to the x-axis, as is illustrated in FIG. 2*a*. Likewise, as shown in FIG. 2*b*, the center distance between the gear axis $C_1$ of a workpiece 12 clamped to the workpiece spindle and the gear axis $C_2$ of the fine-machining tool 10 also runs parallel to the X-axis.

As is evident from FIGS. 2*a* and 2*b*, the center distance depends on the relative position of the gear axes C1, C2, in which the respective toothed contours of the fine-machining tool 10 and the dressing tool 11 or the workpiece 12 mesh with each other in the dressing or machining process. In the illustrated example, the gear axis $C_2$ of the fine-machining tool 10 extends in the X/Y-plane, while the gear axis $C_1$ or the dressing tool 11 or the workpiece 12 extends parallel to the Z-axis. FIG. 2*b* illustrates the position of maximum center distance a'. In this case, the center distance lies on a radius vector of the fine-machining tool 10 that is oriented orthogonal to the Y/Z-plane.

In the dressing process, the respective gear axes $C_2$ and $C_1$ of the fine-machining tool 10 and the dressing tool 11 are set relative to each other at a position of reduced center distance a which is offset from the position of the maximum center distance a'. This is illustrated in FIG. 2*a*. In the X/Y/Z reference system of this drawing, the gear axis $C_1$ of the fine-machining tool is offset in the X/Y-plane compared to the position of the maximum center distance a' which is shown in FIG. 2*b*. The dressing tool 11 preferably performs a stroke movement in the direction of its gear axis $C_1$. In addition, movement components directed parallel to the X/Y-plane can be superimposed in a known manner in order to maintain a line contact with the fine-machining tool 10 and/or to generate desired amounts of crowning.

In contrast to the dressing process illustrated in FIG. 2*a*, the machining of the workpieces 12 with the dressed fine-machining tool 10 takes place in the position illustrated in FIG. 2*b*, i.e., the position of maximum center distance a' between the gear axis $C_2$ of the fine-machining tool 10 and the gear axis $C_1$ of the workpiece 12.

FIG. 3 represents a view of the dressing process analogous to FIG. 2*a*, but with the difference that the dressing tool 11 is drawn in three different positions numbered 1, 2 and 3. Shown below the three positions are the respective tooth trace shapes $l_1$, $r_1$; $l_2$, $r_2$; $l_3$, $r_3$ generated on the dressed fine-machining tool. As in FIGS. 2a and 2b, the gear axis $C_1$ of the dressing tool 11 in FIG. 3 runs parallel to the Z-axis, but the gear axis $C_2$ of the fine-machining tool 10 is skewed clockwise in the Y/Z-plane by the amount of the axis-crossing angle.

If the dressing tool 11 with cylindrical toothed circumference is arranged in the position 1 of maximum center distance, the teeth of the dressed fine-machining tool 10 will have an addendum modification that is constant over the tooth width, disregarding flank convexities, and whose value can also be zero. In this case, the left and right tooth traces $l_1$, $r_1$ are parallel to each other, as shown in FIG. 3. In contrast, if the dressing tool 11 is arranged in one of the positions of reduced center distance 2 or 3, which are offset from the position 1 of maximum center distance, the resultant tooth flank modifications $l_2$, $r_2$ and $l_3$, $r_3$ will be conical. If the axis-crossing angle is left unchanged during the dressing process, the respective modifications of the left and right flanks will be symmetrical to each other. Since the axis-crossing angle relative to the X/Y/Z system of FIG. 3 has a positive value, the penetration depth of the dressing tool 11 in the position 2 is shallower on the side of the fine-machining tool 10 facing the viewer than on the side facing away from the viewer. Thus, the tooth thickness decreases in the direction of the axis of the fine-machining tool 10, as visualized in FIG. 3 by the tooth traces $l_2$, $r_2$. In position 3, on the other hand, the penetration depth of the dressing tool 11 is deeper on the side of the fine-machining tool 10 that faces the viewer. The tooth thickness therefore increases in the direction of the axis of the fine-machining tool 10, as visualized in FIG. 3 by the tooth traces $l_3$, $r_3$.

LIST OF REFERENCE SYMBOLS $C_1$ axis of rotation of the tool spindle
$C_2$ axis of rotation of the honing tool
A swivel axis
X linear movement axis in the direction of the center distance
Y linear movement axis
Z linear movement axis
10 fine-machining tool
11 dressing tool
a center distance of dressing tool axis
a' center distance of workpiece axis
12 workpiece
$l_1$, $l_2$, $l_3$, $r_1$, $r_2$, $r_3$ tooth flank profiles

The invention claimed is:

1. Method of fine-machining of a toothed workpiece (12), using a toothed finishing tool (10), said method comprising:
   meshing said toothed finishing tool with the workpiece (12) in mutual tooth engagement,
   said finishing tool (10) being dressed in accordance with a dressing process in which the finishing tool (10) and a toothed dressing tool (11), in tooth engagement with each other, rotate about their respective gear axes (C2, C1) which are arranged relative to each other at a center distance (a) different from zero and an axis-crossing angle different from zero,
   characterized in that the gear axes (C2, C1) of the finishing tool (10) and of the dressing tool (11) are arranged relative to each other in a position that is offset from the position of maximum center distance (a') to a position of reduced center distance (a).

2. Method according to claim 1, characterized in that the toothed contour of the finishing tool (10) is an internal toothed contour, while the toothed contour of the dressing tool (11) is an external toothed contour.

3. Method according to claim 1, characterized in that the toothed contour of the finishing tool (10) is an external contour, while the toothed contour of the dressing tool (11) is an internal contour.

4. Method according to claim 1 characterized in that the finishing tool (10) is a ring-shaped honing tool.

5. Method according to claim 1 characterized in that the tooth thickness of the dressing tool (11), disregarding tooth trace convexities, is constant over the tooth width.

6. Method according to claim 1 characterized in that a superimposed movement component parallel to the gear axis (C1) of the dressing tool (11) is added to the relative movement between the latter and the finishing tool (10).

7. Method according to claim 1 characterized in that a superimposed movement component orthogonal to the gear axis (C1) of the dressing tool (11) is added to the relative movement between the latter and the finishing tool (10).

8. Method according to claim 1 characterized in that for the machining of the workpiece (12) with the dressed finishing tool (10), their respective gear axes (C1, C2) are positioned relative to each other in such a way that their center distance (a') is different from the center distance (a) at which the gear axis of the dressing tool (11) and the gear axis of the finishing tool (10) were positioned in the dressing process.

9. Method according claim 8, characterized in that the workpiece (12) is machined with the dressed finishing tool (10) in a position of maximum center distance (a') between the gear axis (C2) of the finishing tool (10) and the gear axis (C1) of the workpiece (12).

10. Method according to claim 8 characterized in that for the machining of the workpiece (12) the axis-crossing angle between the gear axes (C1, C2) of the workpiece (12) and finishing tool (10) is set to a value which corresponds to the axis-crossing angle at which the gear axes (C1, C2) of the dressing tool (11) and the finishing tool (10) were positioned in the dressing process.

11. Method according to claim 8 characterized in that for the machining of the workpiece (12), the axis-crossing angle between the gear axes (C1, C2) of the workpiece (12) and the finishing tool (10) is set to a value which is offset relative to the axis-crossing angle at which the gear axes (C1, C2) of the dressing tool (11) and the finishing tool (10) were positioned in the dressing process.

12. Method according to claim 8 characterized in that a movement component in the direction of the gear axes (C1, C2) is superimposed on the relative movement between the finishing tool (10) and the workpiece (12) which are in meshing engagement with each other in the machining process.

13. Device for the fine-machining of a toothed workpiece (12), comprising a toothed finishing tool (10) that is rotatable about its gear axis (C2), a toothed dressing tool (12) that is rotatable about its gear axis (C1), a device to set the relative position between the gear axes (C1, C2), and a controller device serving to control the position-setting device, characterized in that the controller device is designed with the capability to perform a setting that enables the method according to claim 1 to be executed.

14. Device according to claim 13, characterized in that the controller device runs under the commands of a program.

15. Device according to claim 14 wherein said program comprises a software program, comprising program code to run the program-controlled controller device.

\* \* \* \* \*